United States Patent [19]

Umeda

[11] Patent Number: 5,452,058
[45] Date of Patent: Sep. 19, 1995

[54] INFORMATION RECORDING SYSTEM CAPABLE OF PROTECTING SECRECY

[75] Inventor: Takao Umeda, Mito, Japan

[73] Assignees: Hitachi, Ltd.; Hitachi Koki Co., Ltd., both of Tokyo, Japan

[21] Appl. No.: 191,249

[22] Filed: Feb. 3, 1994

Related U.S. Application Data

[63] Continuation of Ser. No. 909,872, Jul. 7, 1992, abandoned.

[30] Foreign Application Priority Data

Sep. 30, 1991 [JP] Japan .................. 3-276215

[51] Int. Cl.⁶ .............................................. G03G 21/00
[52] U.S. Cl. .................... 355/204; 355/201; 355/311; 355/323
[58] Field of Search ............... 355/201, 202, 203, 208, 355/209, 204, 311, 323, 321; 271/288, 289, 290, 298, 265, 9; 250/271; 356/71; 380/55; 346/139 R, 140 R, 141

[56] References Cited

U.S. PATENT DOCUMENTS

| | | | |
|---|---|---|---|
| T102,102 | 8/1982 | Bolle et al. | 355/201 |
| 4,626,672 | 12/1986 | Sapitowicz et al. | 355/323 X |
| 4,763,889 | 8/1988 | Dei et al. | 271/9 |
| 4,899,136 | 2/1990 | Beard et al. | 340/706 |
| 4,970,554 | 11/1990 | Rourke | 355/202 |
| 4,980,719 | 12/1990 | Allen et al. | 355/201 |
| 5,029,833 | 7/1991 | Tani et al. | 271/9 |
| 5,067,835 | 11/1991 | Yamamoto et al. | 355/311 X |
| 5,124,748 | 6/1992 | Tanabe et al. | 355/200 |
| 5,216,461 | 6/1993 | Maekawa et al. | 355/202 |
| 5,241,341 | 8/1993 | Okauchi et al. | 355/202 |

FOREIGN PATENT DOCUMENTS

| | | | |
|---|---|---|---|
| 0172486 | 10/1982 | Japan | 355/323 |
| 60-12859 | 1/1985 | Japan. | |
| 60-165666 | 8/1985 | Japan. | |
| 0140435 | 6/1986 | Japan | 355/201 |

*Primary Examiner*—Robert Beatty
*Attorney, Agent, or Firm*—Kenyon & Kenyon

[57] ABSTRACT

A plurality of sheet hoppers and a plurality of output stackers are provided so that sheets of paper are selectively output from a specific sheet hopper. The printed sheet is output to a specific output stacker according to a type of document to be printed. The specific output stacker can be selected based on a control signal from a computer or a signal from a mark discrimination sensor, and the printed sheet of a confidential/secret document can be output to the specific output stacker even if a general document and a confidential/secret document are both printed by a single recording apparatus.

28 Claims, 3 Drawing Sheets

INFORMATION RECORDING SYSTEM CAPABLE OF PROTECTING SECRECY

This is a continuation of U.S. patent application Ser. No. 07/909,872 filed on Jul. 7, 1992, now abandoned.

BACKGROUND OF THE INVENTION

1. Field of the Invention

The present invention relates to a recording apparatus such as an electrophotographic, an ink jet or a thermal transfer apparatus and an information processing system using this kind of recording system. More particularly, the present invention relates to a recording system in which normal documents and confidential/secret documents are both to be printed and an information processing system using the same.

2. Description of the Related Art

A recording apparatus has previously been used as a data outputting device of an information processing apparatus such as a computer and a word processor. The information processing apparatus is defined as an apparatus for producing calculation data or document data to be printed, such as a computer or a word processor. Following the recent advancement of information processing techniques such as desk-top publishing techniques and file processing techniques, and the recent development of relevant devices, there has been an increasing need for publishing data inside a company by printing various types of documents by themselves. Prior to this, a company would ask outside printers to print such company documents. This trend of printing these various types of documents within a company has occurred because the printing and publishing inside the company can be performed quickly and less expensively and allows the company to maintain secrecy of the company information.

Since company documents include both general documents and documents covering confidential/secret information. (hereinafter to be referred to as confidential documents), it has been necessary to separate the time for printing confidential documents from the time for printing general documents. Otherwise it has been necessary for a person in charge of printing to attend the printing machine during the printing of confidential documents in order to maintain secrecy of the company documents, when printing and publishing is carried out inside the company.

In this case, confidential documents are not limited to the above-described documents including information which must be kept secret. The confidential documents mentioned in this application also include contract documents, budget documents, etc. which need to be separated in advance from the general documents.

In the case of general documents, there has been a problem that some work load is required to sort printed documents by destination when there are many distribution destinations for these documents.

In order to maintain secrecy of information, JP-A-60-12859, for example, discloses an invention which enables locking of sorters to provide private mail boxes. Further, in order to specify distribution destinations, JP-A-60-165666, for example, discloses an invention which enables printing of a bar code with a toner image at a part of a printed sheet of paper, reading this bar code with a reader and selecting a sorter for distributing the printed sheet.

However, according to the prior-art techniques, no consideration has been given to a method of keeping secrecy of information or a method of printing by providing a mark or the like on the printed sheet to indicate confidential documents although such confidential documents and general documents are printed together. Therefore, there has been a problem that it is difficult to separate and/or distinguish between printed general documents and printed confidential documents. A problem has also occurred that after printing confidential documents, it is necessary to collect the primed confidential documents from each sorter and stamp a seal on the documents which identifies the printed documents as confidential documents in order to call attention to the intended confidential handling of the documents.

Further, in the case of printing general documents, a supporting system is required to provide a suitable type of printing paper ranging from a thin paper having a total weight of 40 kg per a set of sheets to a thick paper having a total weight of 180 kg per a set, to meet various purposes. For example, when general documents are to be printed for the purpose of preparing OHP slides for a presentation, these documents need to be printed on OHP films, and when general documents are names and addresses for printing on envelopes, the documents need to be printed on glued sheets. Further, depending on the contents of documents to be printed, it may be necessary to use preprinted sheets of paper having printed formats in advance when specific contents such as charges or contracts are to be printed. According to the prior-art techniques, recording systems having a plurality of paper hoppers are being widely used. However, these hoppers are used only to separate sizes of papers, and no consideration has been given to the above-described wide support, so that there has been a problem on the degree of freedom in selecting types of sheets of paper.

SUMMARY OF THE INVENTION

The present invention relates to a recording system which can sufficiently secure secrecy of information when general documents and confidential/secret documents are printed basically by one printing system.

The present invention additionally relates to a recording system which can discriminate, by appearance, between sheets printed with confidential/secret documents and sheets printed with general documents when the printed sheets are output to the stacker of the recording system after printing, in order to call attention to the handling of printed confidential/secret documents.

Further, the present invention provides an information processing system which can sufficiently secure secrecy of information even when print data of general documents and confidential/secret documents are sent from each information processing apparatus to a recording apparatus when a plurality of such information processing apparatuses, such as computers, word processors, personal computers, W.S.'s, O.H.P.'s and desk top publishing, are connected with a plurality of separately provided recording apparatuses through communication lines or optical fibers and the recording apparatuses are used as print servers.

According to the present invention, the following effects can be obtained.

(1) Printed sheets of confidential/secret documents and printed sheets of general documents are output separately, so that distribution of the printed documents is facilitated.

(2) A mark for identifying a confidential/secret document is printed on a printed sheet of a confidential/secret document at a part of the sheet, so that a sufficient attention can be called to the handling and distribution of the printed sheet.

(3) A printed sheet of paper having a confidential/secret document printed on at least one side of this paper has a printed mark to mean a confidential/secret document at a part of the paper, so that this mark is read by the recording system and the paper is output to a specific stacker separate from general documents.

(4) A plurality of sheet hoppers can accommodate different types of sheets and when contents of a document requiring secrecy are to be printed sheets of paper are taken out from a specific sheet hopper and the document is printed on these specified sheets. After the printing, these sheets are output to a specific stacker separated from stackers for general printed documents, so that secrecy is maintained and these sheets can be easily identified as printed sheets of confidential/secret documents.

(5) When a recording apparatus is to be used as a print server for a plurality of information processing apparatuses, at least two printers are used, one for printing only documents of specific contents and the other for printing general documents, so that an output printer can be selectively used to print documents depending on the contents of documents for printing at each information processing apparatus. Therefore, this system is effective for maintaining secrecy of printed documents and can effectively handle and arrange printed sheets.

(6) Sheets printed with contents of a document requiring secrecy are output to a lockable stacker and are then output to each sorter within the stacker, and a signal which indicates that the sheets printed with confidential/secret documents are being output is sent to an information processing apparatus such as a computer, so that secrecy of printed documents can be ensured and printing sheets can be handled efficiently.

DETAILED DESCRIPTION

An information processing system according to the present invention will be explained in detail with reference to the attached drawings.

First, referring to FIG. 1, the configuration of the information processing system according to one embodiment of the present invention will be explained. An information processing system 100 includes a recording apparatus 14 of an electrophotographic system and an information processing apparatus 16 such as a host computer for sending a data signal to the recording apparatus 14. The recording apparatus 14 includes a control section 15 including a printer control circuit for controlling a sequence inside the recording apparatus 14 and an interface circuit with the information processing apparatus 16. When a data signal and a control signals for controlling the start of the recording apparatus 14 are sent from the apparatus 16 to the printer control section 15, the recording apparatus 14 is initiated to start a printing operation. In the recording apparatus 14, an optical pattern based on the data signal is irradiated by an exposing system 2 on to a photoconductor drum 1 charged by a charger, so that a latent pattern is formed on the drum 1. A toner image after having been developed by a developer 3 is transferred to a sheet of paper 4 by a transfer charger 5 and is then fixed on the sheet by a fixer 6.

A stacker switching mechanism 8 selects a suitable stacker out of two output stackers 9 and 10. Sheets of paper printed with general documents are carried to the stacker 9 and sheets of paper printed with a confidential/secret document are carried to the stacker 10. The stacker switching operation is carried out in accordance with a control signal sent from the control section 15. The stacker 10 has a locking section 11 in which printed sheets are protected by a key, a mnemonic code and an IC card. A sheet hopper 13 accommodates specific sheets of paper for printing a confidential/secret document on them, such as, for example, colored sheets, preprinted sheets with a "secret" or "confidential" mark or sheets having a watermark of "secret". In printing documents, sheets are selectively taken out from a hopper 12 and the hopper 13 based on an instruction from the apparatus 16, and the documents are printed on the selected sheets. The printed sheets of paper are selectively output to the stackers 9 and 10. As a result, even when print data of both a general document and a confidential/secret document are sent continuously from the computer 16, copies of the general document and the confidential/secret document are separated and output to the separate stackers in the recording apparatus 14. Thus, by using only one recording apparatus or printer, confidential/secret documents can be printed to maintain security while easily distinguishing printed confidential/secret documents and printed general documents.

Figure 1:
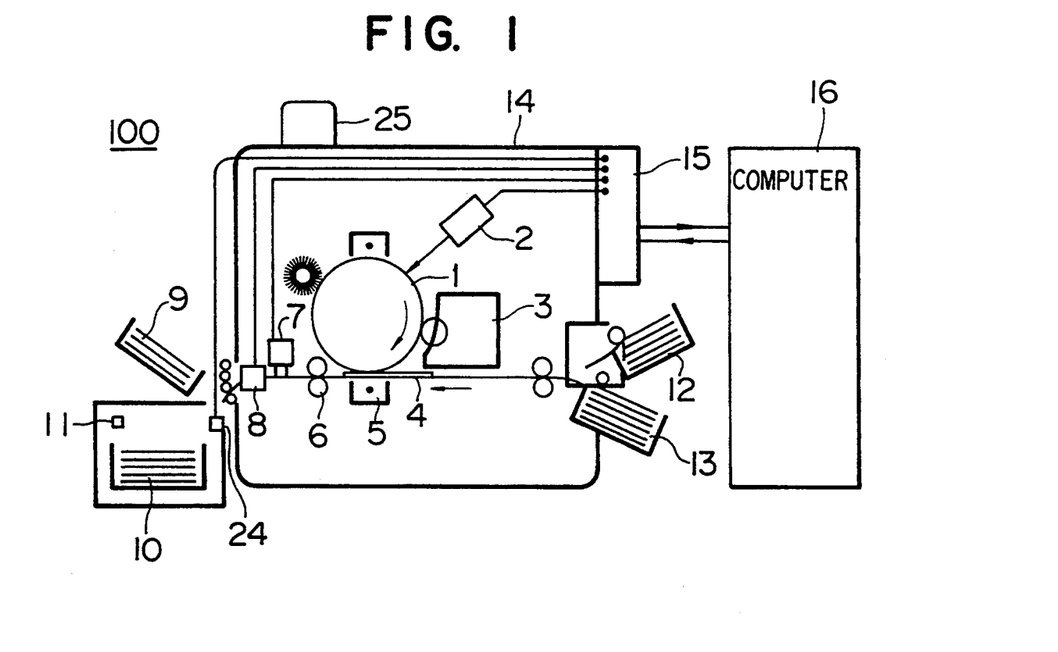
FIG. 1 is an explanatory diagram for showing one embodiment of the recording system according to the present invention.

In FIG. 1, a marking section 7 prints a mark "secret" or "confidential" on the sheets on which a secret or confidential document has been printed. A roller type stamp is considered as the marking section 7. A red color is desirable as the color of ink to be used for printing the mark, because this color, showing a confidential/secret document, facilitates the recognition of this mark at a glance and helps improving the management of confidential/secret documents.

Referring to FIG. 1, when a sensor 24 has detected that sheets of paper printed with confidential/secret documents were output to the stacker 10, the control section 15 displays this fact in a display section 25 to enable a user to recognize that confidential/secret documents have been printed. A signal from the sensor 24 may be transferred to the information processing apparatus 16, which is a transmitter of the print data of confidential/secret documents, to display completion of the printing of the confidential documents on the display unit of the apparatus 16. With this arrangement, an operator at the apparatus 16 is informed that the confidential/secret document has been securely sent to the recording apparatus 14 and then has been printed, to thereby further improve the level of maintenance of secrecy.

Figure 2:
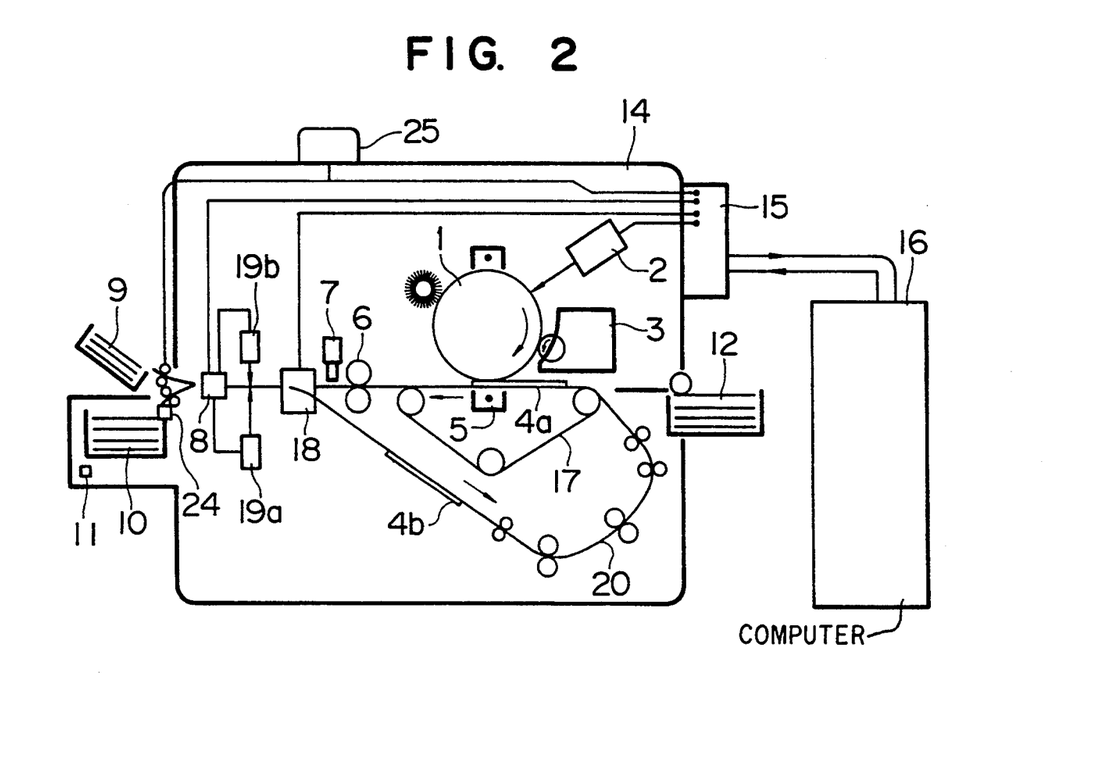
FIG. 2 is an explanatory diagram for showing another embodiment of the recording system according to the present invention.

FIG. 2 shows a configuration of the recording apparatus 14 which enables a double-side printing, or a printing on both sides of a sheet of paper. In this case, a belt transfer system is employed to transfer a toner image onto a sheet of paper from the photoconductor drum 1. Charge having a polarity opposite to that of the toner is applied to a dielectric belt 17 by a corona charger 5, and thereby while sheets of paper are being carried the image is transferred onto these sheets. In the case of a single-side printing, a sheet 4a is sent to the transfer section from the sheet hopper 12 to transfer the toner image onto the sheet. The transferred image is fixed by the fixer 6 and then the printed sheet is sent to the switching mechanism 8 to be output to the stacker 10, if a confidential/secret document, in accordance with a control signal sent from the control section 15. On the other hand, in the case of a double-side printing, the sheet transfer direction is changed by a switching-back section 18 so that the printed sheet is again carried to the transfer section through a carrier route 20. At this time, the printing side is reversed and a toner image is printed on the reverse side.

When a confidential/secret document is to be printed, a mark for indicating "confidential" or "secret" may be printed by the marker 7. When the confidential/secret document is to be printed on both sides of a sheet, it is desirable that this mark is printed on both sides of the sheet. Sensors 19a and 19b detect the presence or absence of the mark on a sheet. Once the mark on either side of the sheet has been detected, a detection signal is sent to the mechanism 8 so that the sheet is sent to the stacker 10. The mechanism 8 may also be controlled by a control signal sent from the control section 15, based on the detection signal.

Although not shown in FIG. 2, the sheet hopper 13 shown in FIG. 1 may also be provided in addition to the hopper 12 and specific sheets for printing confidential/secret documents may be used such as, for example, colored sheets, preprinted sheets with a "secret" or "confidential" mark or sheets having a watermark of "secret" or "confidential", so that the specific sheets printed with the confidential/secret documents are detected by the sensors 19a and 19b to be output to a selected stacker. Further, when a plurality of the stackers 10 for confidential/secret documents are provided or when a plurality of sorters are provided within the stacker 10, the stackers or the sorters can be selectively used in correspondence to sections which handle the confidential/secret documents or distribution destinations of these confidential/secret documents. In this case, the control section 15 may control a selecting section similar to the mechanism 8 provided in the stacker 10, in response to a selection instruction sent from an input of the recording apparatus or the apparatus 16. Selection of the stacker or sorter is applied not only to the double-side printing but also to the single-side printing.

Figure 3:
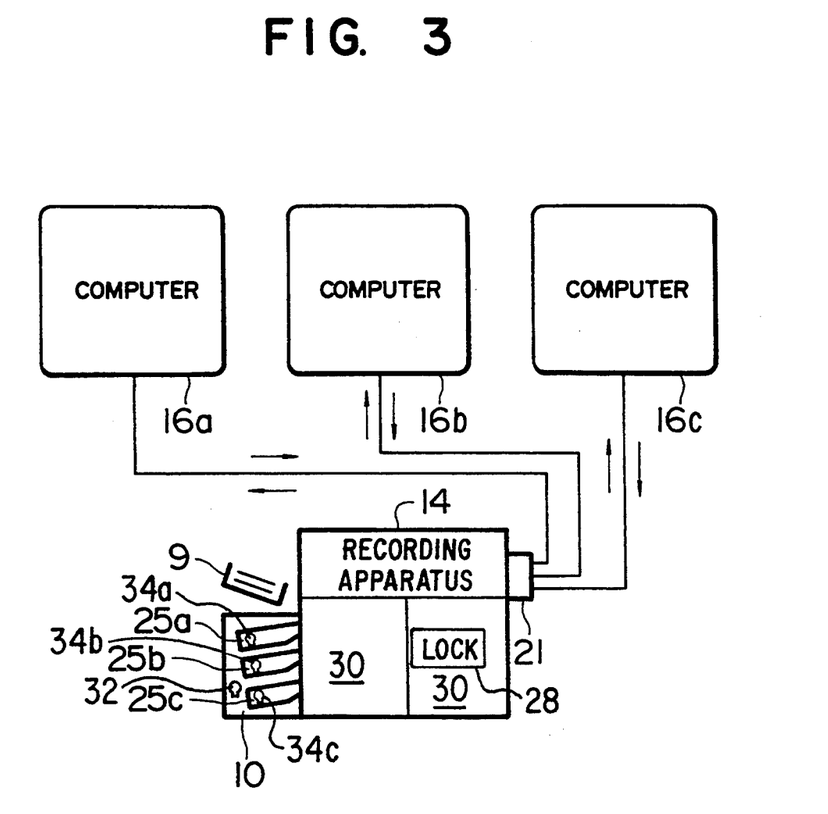
FIG. 3 is an explanatory diagram for showing one embodiment of the information processing system according to the present invention.

A locking mechanism 28 illustrated in FIG. 3 is provided to doors 30 for internal inspection of the recording apparatus 14 shown in FIGS. 1 and 2 respectively, and the doors are designed so that they may not be opened without a predetermined key, a mnemonic code or an IC card.

While the recording apparatus 14 of the electrophotographic system having one developer 3, as shown in FIG. 1 or 2 respectively is of a monochromatic printing system a multicolor recording apparatus having a plurality of developers may also be used as the apparatus 14. In this case, a mark of a desired shape can be easily printed in a desired color instead of using the marker 7 as shown in FIG. 1. The multicolor recording apparatus may of course be equipped with the marker 7.

FIG. 3 shows the information processing system according to one embodiment of the present invention in which one recording apparatus 14 is used as a print server for a plurality of information processing apparatuses such as computers and the like. According to this system, data from computers 16a, 16b and 16c installed in different sections a, b and c respectively, can be printed by one recording apparatus 14. The computer can be connected with the recording apparatus though a transmission medium such as a public line, an optical fiber or a radio.

Referring to FIG. 3, an interface 21 for a print server can be used for print data. A plurality of stackers 9 and 10 are provided in one recording apparatus 14, and the stacker 10 is a lockable stacker to which printed sheets of confidential/secret documents are output. Further, a plurality of sorters 25a, 25b and 25c may be provided in the stacker 10 to be used for the computers 16a, 16b and 16c respectively which are connected to the recording apparatus 14.

Locking systems 32 and 34a, 34b and 34c may respectively be separately provided for the stacker 10 and the sorters 25a, 25b and 25c which are accommodated in the stacker 10 to maintain secrecy of information. With this arrangement, printed confidential/secret documents can be handled by individual sections, to ensure a double security system for the handling of the confidential/secret documents, for further improvement of the secrecy. When the printed confidential/secret document is to be transmitted from the section a to the section c or from the section b to the section c, a series of display operations to indicate that the printing operation of the confidential/secret document by the recording apparatus 14 is completed may be carried out for display units at section or distribution destinations to which the printed confidential/secret documents are to be sent, at a point of time when the printed confidential secret documents have been output to the stacker. More particularly, a notification signal indicative of the completion of printing is sent from the recording apparatus 14 to the computer, which sent data of the confidential/secret document, to be displayed at the computer, and at the same time, the notification signals are also sent to computers, if available at the distribution destination sections, to be displayed at these computers. This arrangement avoids the risk of leaving the printed confidential/secret documents to be stored in the output stacker for a long time and ensures management of the confidential/secret documents, for further improvement of secrecy.

Figure 4:
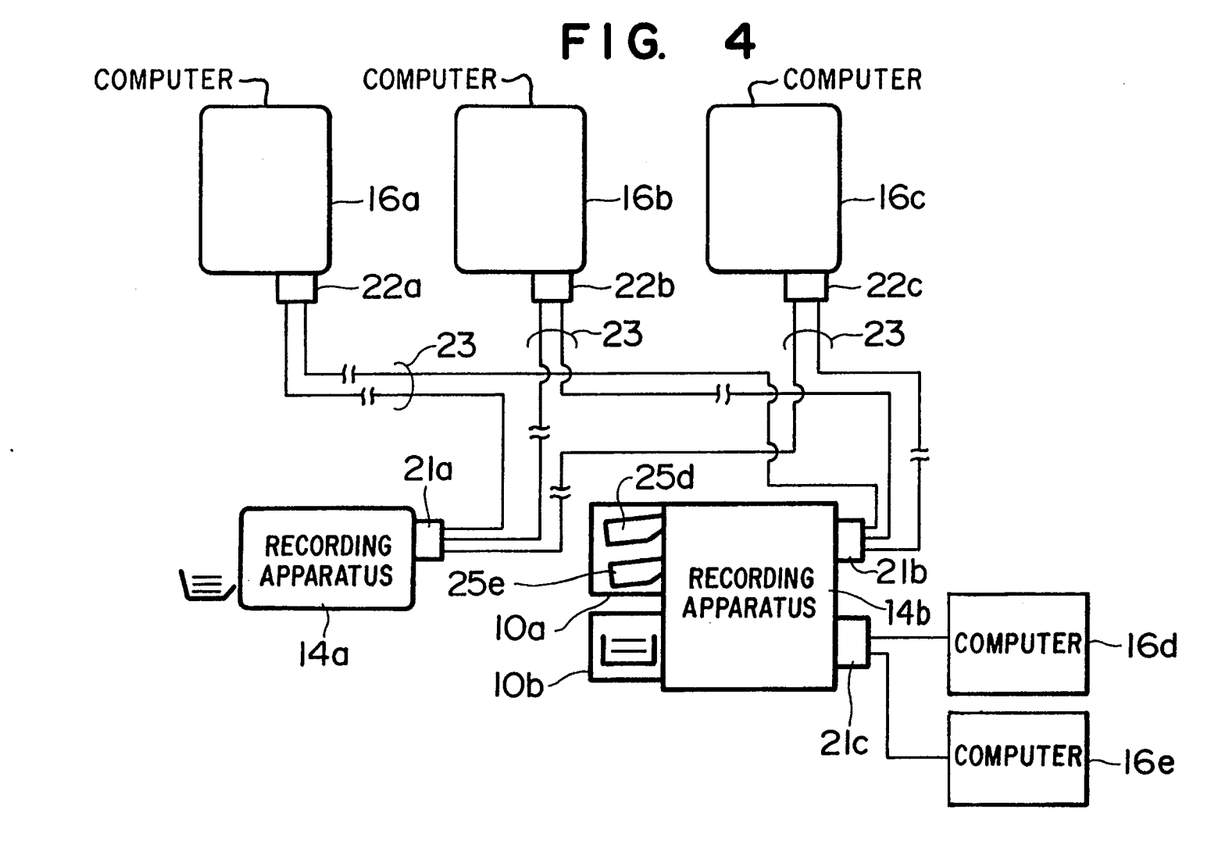
FIG. 4 is an explanatory diagram for showing another embodiment of the information processing system according to the present invention.

FIG. 4 shows a case where when local operating offices at remote places output print data of a document from computers 16a, 16b and 16c to the center such as a head office, through communication lines 23, by using transceiver units 22a, 22b and 22c respectively, two recording apparatuses, one recording apparatus 14a being for printing a general document and the recording apparatus 14b for printing a confidential/secret document, are provided at the center to collectively print the print data transmitted from the computers in accordance with a type of document. An interface 21a for recording apparatus 14a and interfaces 21b and 21c for recording apparatus 14b can be used for print data. A plurality of stackers 10a and 10b may be provided for the recording apparatus 14b and a plurality of sorters 25d and 25e may be provided within the stacker 10a in such a manner that the printed confidential/secret document is selectively output to one of the sorters in accordance with distribution destinations. Further, a sheet-collection request signal may be sent from the recording apparatus 14b to computers 16d and 16e which are installed at the distribution destinations, at the point of time when the printed sheets have been output to the stacker 10a. This arrangement enables a quick delivery of printed confidential/secret documents to relevant sections. In the above example, the computers 16d and 16e are assumed to be located at the operating office where the recording apparatuses 14a and 14b are installed. When the whole system is located within the same building, an optical fiber or other cable may be used instead of a communication line, so as to connect between each of the computers 16a, 16b and 16c and the recording apparatus 14 which are located at different floors. Thus, the same function as that described above can be obtained. As a result, in the system using the recording apparatus as a print server for a plurality of information processing apparatuses, printed sheets of confidential/secret documents and general documents can be output separately, to secure sufficient secrecy of the printed documents.

As described above in detail, the present invention has the following features.

(1) The recording apparatus has a plurality of hoppers and a plurality of stackers, to take out specific sheets of paper according to contents of printing and to separately output the printed sheets to a specified stacker.

(2) The recording apparatus has a plurality of stackers, i.e., stackers for general printed sheets and stackers for printed sheets of specific contents such as, for example, confidential/secret documents, and the stackers can be selectively used according to contents of printing, based on a command from an information processing apparatus such as a computer or the like.

(3) The stacker for printed sheets of confidential/secret documents and a plurality of sorters stored in this stacker, are each lockable, and only eligible persons can collect the printed confidential/secret documents by using a key, a mnemonic code or an IC card.

(4) In order to discriminate between the sheets printed with confidential/secret documents and the sheets printed with general documents, a mark indicating "secret" or "confidential" may be printed on a portion of each sheet printed with the confidential/secret documents. Further, a plurality of hoppers may be provided and specific sheets, such as colored sheets, preprinted sheets printed with a "secret" or "confidential" mark or sheets having a watermark of "secret" or "confidential", may be preset in a part of these hoppers so that these sheets are taken out for printing confidential/secret documents thereon.

(5) When a recording apparatus capable of printing on both sides of a sheet of paper is used and in case of printing confidential/secret documents on at least one side of the sheet, a mark indicative of "secret" or "confidential" is printed on both sides of the sheet. A sensor provided within the recording apparatus discriminates presence or absence of this mark on each sheet and selectively outputs the printed sheets to a selected stacker based on the discriminated presence or absence of this mark on each sheet.

(6) In the case of using a recording apparatus as a print server for a plurality of information processing apparatuses, a recording apparatus for printing general documents and a recording apparatus for printing confidential/secret documents may be provided.

(7) When sheets printed with confidential/secret documents have been output to a stacker after completing the printing, a signal for confirming the output is displayed by the recording apparatus itself or this signal is sent to a separate information processing apparatus and displayed there.

(8) Doors for an internal inspection of the recording apparatus for confidential/secret documents are lockable, and only eligible persons can open the doors to take out the printed sheets, by using a key, a mnemonic code or an IC card.

I claim:

1. An information recording system, comprising:

an information processing system for issuing a print command corresponding to a confidentiality of print data; and a recording apparatus including:

control means responsive to the print command, for outputting a print instruction and the print data and issuing a sheet supply instruction and a stacker selection instruction based on the confidentiality of the print data;

a printing section responsive to the print instruction for printing the print data on a sheet of paper, said printed sheet of paper being provided from said printing section with a predetermined characteristic corresponding to the confidentiality of the print data;

sheet supply means for supplying a sheet of paper to said printing section in response to the sheet supply instruction;

a plurality of stackers for stacking printed sheets of paper provided from said printing section, said plurality of stackers including a confidential stacker; and stacker selecting means for selecting the confidential stacker from among said plurality of stackers, in response to the stacker selection instruction;

wherein said sheet supply means comprises confidential sheet supply means for supplying a confidential sheet of paper to said printing section in response to the sheet supply instruction and general sheet supply means for supplying a general sheet of paper to said printing section in response to an input general sheet supply instruction, said information processing system includes means for issuing a general print command for a general type of print data, said control means further comprises means for outputting the general sheet supply instruction to said sheet supply means and a general stacker instruction to said stacker selecting means in response to the general print command, and said stacker selecting means includes means for selecting one of said plurality of stackers other than said confidential stacker in response to the general stacker selection instruction.

2. An information recording system according to claim 1, wherein said confidential stacker comprises a plurality of sorters.

3. An information recording system according to claim 1, wherein said confidential stacker and doors for an internal inspection of said recording apparatus are lockable.

4. An information recording system according to claim 1, wherein said information processing system includes a display unit, and wherein said control means includes means for outputting to said display unit data indicative of completion of the printing operation such that the printing completion data is displayed.

5. An information recording system according to claim 1, wherein said recording apparatus further comprises marking means for printing a predetermined mark on the printed sheet in response to a marking instruction input thereto, and wherein said control means further includes means for outputting the marking instruction to said marking means in response to the print command.

6. An information recording system according to claim 1, wherein said recording apparatus further comprises detecting means for detecting ejection of the printed sheets of paper for the confidential type of print data to said confidential stacker, and said information processing system further comprises means for informing completion of printing the confidential type of print data in response to the detection by said detecting means.

7. An information recording system according to claim 1, wherein said predetermined characteristic is a color of said sheet of paper.

8. An information recording system according to claim 1, wherein said predetermined characteristic is a mark stamped on said sheet of paper.

9. An information recording system according to claim 8, wherein said mark is stamped on said sheet of paper after said print data is printed on said sheet of paper.

10. An information recording system according to claim 1, wherein said predetermined characteristic is a characteristic of said sheet of paper before said print data is printed on said sheet of paper.

11. An information recording system according to claim 8, wherein said printing section comprises:
a transfer device printing the print data on the sheet of paper; and
marking means for stamping said mark on said sheet of paper, wherein said marking means is downstream from said transfer device in a paper moving direction.

12. An information recording system according to claim 1, wherein said predetermined characteristic allows a user to determine the confidentiality of print data on a sheet of paper without reading the print data.

13. An information recording system, comprising:
communication media;
a recording apparatus for receiving record data, a confidentiality level of the record data and an instruction through said communication media and transmitting a record end notice through said communication media upon an end of a recording operation on the received record data, comprising:
control means responsive to the instruction, for outputting a record instruction and the record data, and issuing a sheet supply instruction and a mark instruction based on the confidentiality level of the record data;
sheet supply means for supplying sheets of paper in response to the sheet supply instruction;
recording means for recording the record data on the sheets of paper supplied from said sheet supply means in response to the record instruction;
marking means for recording a mark on the printed sheets of paper in response to the mark instruction, said, mark corresponding to the confidentiality level of the record data recorded on the printed sheets of paper;
a plurality of stackers for stacking recorded sheets of paper provided from said recording means, said plurality of stackers including a confidential stacker;
detecting means for detecting the mark from each of the printed sheets; and
selecting means for selecting the confidential stacker from among the plurality of stackers in accordance with the detecting result; and
an information processing apparatus for transmitting the record data and the instruction to said recording apparatus through said communication media and receiving the record end notice from said recording apparatus through said communication media:
wherein said sheet supply means comprises confidential sheet supply means for supplying a confidential sheet of paper to said recording means in response to the sheet supply instruction and general sheet supply means for supplying a general sheet of paper to said recording means in response to an input general sheet supply instruction, said information processing apparatus includes means for issuing a general print command for a general type of print data, said control means further comprises means for outputting the general sheet supply instruction to said sheet supply means and a general stacker instruction to said selecting means in response to the general print command, and said selecting means includes means for selecting one of said plurality of stackers other than said confidential stacker in response to the general stacker selection instruction.

14. An information recording system according to claim 13, wherein said confidential stacker comprises a plurality of sorters.

15. An information recording system according to claim 13, wherein said confidential stacker and doors for an internal inspection of said recording apparatus are lockable.

16. An information recording system according to claim 1, wherein said marking means records said mark on said sheet of paper after said record data is recorded on said sheet of paper.

17. An information recording system according to claim 13, wherein said marking means is downstream from said recording means in a paper moving direction.

18. An information recording system according to claim 13, wherein said mark allows a user to determine the confidentiality of record data on a sheet of paper without reading the record data.

19. A method for recording information, comprising steps of:
transmitting a record instruction, a record data and a confidentiality level of the record data from an issuing one of a plurality of information processing apparatuses;
recording the record data on sheets of paper;
selectively stacking each of the recorded sheets of paver in one of a plurality of stackers determined in accordance with the transmitted confidentiality level of the record data which has been recorded on that sheet of paper, wherein each sheet of paper provided to the plurality of stackers has a predetermined characteristic which corresponds to the confidentiality level of the record data which has been recorded on the sheet of paper;

transmitting a notice indicating completion of the recording to the issuing information processing apparatus when a recorded sheet has been stacked in one of the plurality of stackers by said selectively stacking step:

informing a user of the transmitted notice;

supplying a confidential sheet of paper to said recording step if the transmitted confidentiality level is a confidential level;

supplying a general sheet of paper to said printing section if the transmitted confidentiality level is a general level;

issuing a general record instruction for a general type of record data;

issuing a confidential record instruction for a confidential type of record data;

selectively stacking said recorded sheets of paper in a general one of said plurality of stackers in response to the general record instruction; and selectively stacking said recorded sheets of paper in a confidential one of said plurality of stackers in response to the confidential record instruction.

20. A method according to claim 19, further comprising a step of marking a predetermined mark on the recorded sheets of paper in accordance with the confidentiality level of the record data.

21. A method according to claim 20, wherein said selectively stacking step comprises steps of:

detecting the predetermined mark on each of the recorded sheets of paper, determining the one stacker from among the plurality of stackers in accordance with the detecting result, and stacking the recorded sheets of paper in the respective selected stackers.

22. A method according to claim 19, wherein said selectively stacking step comprises steps of:

determining the one stacker from among the plurality of stackers in accordance with the confidentiality level of the record data, and stacking the recorded sheets of paper in the one determined stacker.

23. A method according to claim 19, wherein the record instruction includes a destination of the recorded sheets of paper, and said method further comprises a step of transmitting the notice to a destination information processing apparatus to inform a user of the notice.

24. A method for recording information according to claim 19, wherein said predetermined characteristic is a color of said sheet of paper.

25. A method for recording information according to claim 19, wherein said predetermined characteristic is a mark stamped on said sheet of paper.

26. A method for recording information according to claim 25, wherein said mark is stamped on said sheet of paper after said print data is printed on said sheet of paper.

27. A method for recording information according to claim 19, wherein said predetermined characteristic is a characteristic of said sheet of paper before said print data is printed on said sheet of paper.

28. A method for recording information according to claim 19, wherein said predetermined characteristic allows a user to determine the confidentiality of record data on a sheet of paper without reading the record data.

* * * * *

UNITED STATES PATENT AND TRADEMARK OFFICE
CERTIFICATE OF CORRECTION

PATENT NO. : 5,452,058
DATED : 19 September 1995
INVENTOR(S) : Takao UMEDA It is certified that error appears in the above-identified patent and that said Letters Patent is hereby corrected as shown below:

| Column | Line | |
|---|---|---|
| 2 | 5 | Change "although" to --when--. |
| 2 | 11 | Change "primed" to --printed--. |
| 3 | 17 | After "printed" insert --,--. |
| 4 | 7 | Change "signals" to --signal--. |
| 4 | 13 | Change "on to" to --onto--. |
| 4 | 55 | Change "improving" to --to improve--. |
| 5 | 10 | Change "Charge" to --A charge--. |
| 6 | 3 | After "2" insert --,--; after "respectively" insert --,--. |
| 6 | 4 | After "system" insert --,--. |
| 6 | 66 | Before "recording" insert --other--. |

UNITED STATES PATENT AND TRADEMARK OFFICE
CERTIFICATE OF CORRECTION

PATENT NO. : 5,452,058
DATED : 10 September 1995
INVENTOR(S) : Takao UMEDA It is certified that error appears in the above-identified patent and that said Letters Patent is hereby corrected as shown below:

| Column | Line | |
|---|---|---|
| 10 | 50 | Change "claim 1" to --claim 13--. |
| 10 | 68 | Change "paver" to --paper--. |

Signed and Sealed this

Twenty-sixth Day of March, 1996

Attest:

BRUCE LEHMAN

Attesting Officer

Commissioner of Patents and Trademarks